US008821285B2

(12) United States Patent
Lippincott

(10) Patent No.: US 8,821,285 B2

(45) Date of Patent: Sep. 2, 2014

(54) GAMING INTERFACE TECHNIQUES FOR MEDIA CENTERS

(75) Inventor: Louis A. Lippincott, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 3467 days.

(21) Appl. No.: 10/701,054

(22) Filed: Nov. 3, 2003

(65) Prior Publication Data

US 2005/0096134 A1 May 5, 2005

(51) Int. Cl.

| | |
|---|---|
| ***A63F 13/00*** | (2014.01) |
| ***H04N 21/478*** | (2011.01) |
| ***A63F 13/02*** | (2006.01) |
| ***A63F 13/10*** | (2006.01) |
| *H04N 7/10* | (2006.01) |
| *H04N 7/088* | (2006.01) |

(52) U.S. Cl.

CPC ................ *A63F 13/02* (2013.01); *H04N 7/106* (2013.01); *H04N 21/4781* (2013.01); *H04N 7/104* (2013.01); *A63F 2300/308* (2013.01); *H04N 7/088* (2013.01); *A63F 13/10* (2013.01)

USPC ............................................................ 463/39

(58) Field of Classification Search

USPC .......... 463/42, 40, 29, 39; 348/555, 563, 705, 348/706; 700/5, 6, 83; 273/438, 434, 148

See application file for complete search history.

(56) References Cited

U.S. PATENT DOCUMENTS

| | | | | | |
|---|---|---|---|---|---|
| 4,398,189 | A | * | 8/1983 | Pasierb et al. | 463/33 |
| 4,631,502 | A | * | 12/1986 | Tran Kiem | 332/120 |
| 5,421,590 | A | | 6/1995 | Robbins | |
| 5,555,466 | A | * | 9/1996 | Scribner et al. | 725/75 |
| 5,561,419 | A | | 10/1996 | Sasaki et al. | |
| 5,610,665 | A | * | 3/1997 | Berman | 348/564 |
| 5,641,319 | A | * | 6/1997 | Stoel et al. | 463/42 |
| 5,667,440 | A | * | 9/1997 | Sasaki et al. | 463/29 |
| 5,675,828 | A | * | 10/1997 | Stoel et al. | 463/25 |
| 5,708,961 | A | | 1/1998 | Hylton et al. | |

(Continued)

FOREIGN PATENT DOCUMENTS

| | | |
|---|---|---|
| EP | 0 896 472 A2 | 2/1999 |
| EP | 1 217 838 A1 | 6/2002 |

(Continued)

OTHER PUBLICATIONS

Amphion Semiconductor Ltd., CS6804 Transport Stream Demux product description, 4 pages, Feb. 2002.

(Continued)

*Primary Examiner* — David L Lewis

*Assistant Examiner* — Eric M Thomas

(74) *Attorney, Agent, or Firm* — Trop Pruner & Hu, P.C.

(57) ABSTRACT

A media center may include an interface to receive video game information including first and second tags from a communication link. The media center may also include a module to separate the video game information based on the first and second tags. A first modulator may modulate first video game information corresponding to the first tag at a first frequency on a media communication link, and a second modulator may modulate second video game information corresponding to the second tag at a second frequency on the media communication link.

10 Claims, 3 Drawing Sheets

300

310 Receive video data from game interface

320 Tags present?

No

330 Direct all video data to one or more displays

Yes

340 Selectively direct video data to different displays based on tags

350 Selectively direct control data to game interface based on tags

(56) References Cited

U.S. PATENT DOCUMENTS

| | | | | |
|---|---|---|---|---|
| 5,748,261 | A * | 5/1998 | Pugel | 348/724 |
| 5,778,137 | A * | 7/1998 | Nielsen et al. | 386/68 |
| 5,801,785 | A * | 9/1998 | Crump et al. | 348/563 |
| 5,806,849 | A * | 9/1998 | Rutkowski | 463/39 |
| 5,907,715 | A | 5/1999 | Stoel et al. | |
| 6,012,984 | A * | 1/2000 | Roseman | 463/42 |
| 6,072,541 | A * | 6/2000 | Song | 348/706 |
| 6,122,018 | A * | 9/2000 | Sugihara et al. | 348/705 |
| 6,301,306 | B1 * | 10/2001 | McDonald et al. | 375/259 |
| 6,567,984 | B1 | 5/2003 | Allport | |
| 6,579,184 | B1 | 6/2003 | Tanskanen | |
| 2003/0050093 | A1 * | 3/2003 | Licht | 455/557 |
| 2003/0063756 | A1 * | 4/2003 | Geerlings et al. | 381/86 |
| 2003/0181229 | A1 * | 9/2003 | Forster et al. | 455/575.7 |
| 2003/0190940 | A1 * | 10/2003 | Gordon et al. | 463/9 |
| 2006/0061482 | A1 * | 3/2006 | Monney et al. | 340/825.52 |

FOREIGN PATENT DOCUMENTS

| | | |
|---|---|---|
| JP | 8-214031 | 1/1995 |
| JP | 09-253334 | 9/1997 |
| JP | 10-057627 | 3/1998 |
| JP | 11-309271 | 4/1998 |
| JP | 2000-107453 | 4/2000 |
| JP | 2001-006270 | 1/2001 |
| JP | 2002-253866 | 9/2002 |
| WO | WO 97/36391 A1 | 10/1997 |
| WO | WO 01/66209 A1 | 9/2001 |

OTHER PUBLICATIONS

Amphion Semiconductor Ltd., CS6652/54 Multi-Stream MPEG-2 Video Decoders product description, 10 pages, Mar. 2002.

European Patent Office, International Search Report and Written Opinion for International Application No. PCT/US2004/035896, 21 pages, Mar. 3, 2005.

Japanese Patent Office, Japanese Decision of Refusal issued in corresponding Japanese Application No. 2006-538275, 10 pgs., Jul. 15, 2008.

Japanese Patent Office, Office Action (with English translation) issued in corresponding Japan Application No. 2006-538275, 8 pages, Feb. 16, 2010.

* cited by examiner 100
135
145
120
Media Center
Display
130
Display
140
125
Audio/Video
Game Controls
115
Game Box
110

GAMING INTERFACE TECHNIQUES FOR MEDIA CENTERS

BACKGROUND

The claimed invention relates to media centers and, more particularly, to information handling by media centers.

Media centers have been proposed to communicate with a source/conduit of media information (e.g., a communication channel) and to connect to one or more peripheral devices (e.g., televisions, telephony devices, etc.) for which the media information is destined. Media centers may be used to receive media information and route the information among a number of connected peripheral devices. Control devices (e.g., remote controls) associated with the peripheral devices may provide input to the media center to assist in routing desired media information (e.g., television channels) to particular peripheral devices.

Other media devices that may connect to peripheral devices (e.g., televisions) may include specific-purpose computing devices for delivering video game and/or other entertainment content, such as movies. Such devices that have the capability to deliver at least video game content may be generically referred to as game boxes. Examples of such game boxes may include an XBOX™ manufactured by Microsoft, a PLAYSTATION™ manufactured by Sony, or a GAMECUBE™ manufactured by Nintendo, or any similar now-known or later-developed device and/or their portable variants. Unlike media centers that may connect to more than one peripheral device, game boxes typically may be arranged to connect to one peripheral device (e.g., a television or other display device).

BRIEF DESCRIPTION OF THE DRAWINGS

The accompanying drawings, which are incorporated in and constitute a part of this specification, illustrate one or more implementations consistent with the principles of the invention and, together with the description, explain such implementations. In the drawings.

DETAILED DESCRIPTION

The following detailed description refers to the accompanying drawings. The same reference numbers may be used in different drawings to identify the same or similar elements. Also, the following detailed description illustrates certain implementations and principles, but the scope of the claimed invention is defined by the appended claims and equivalents.

Figure 1:
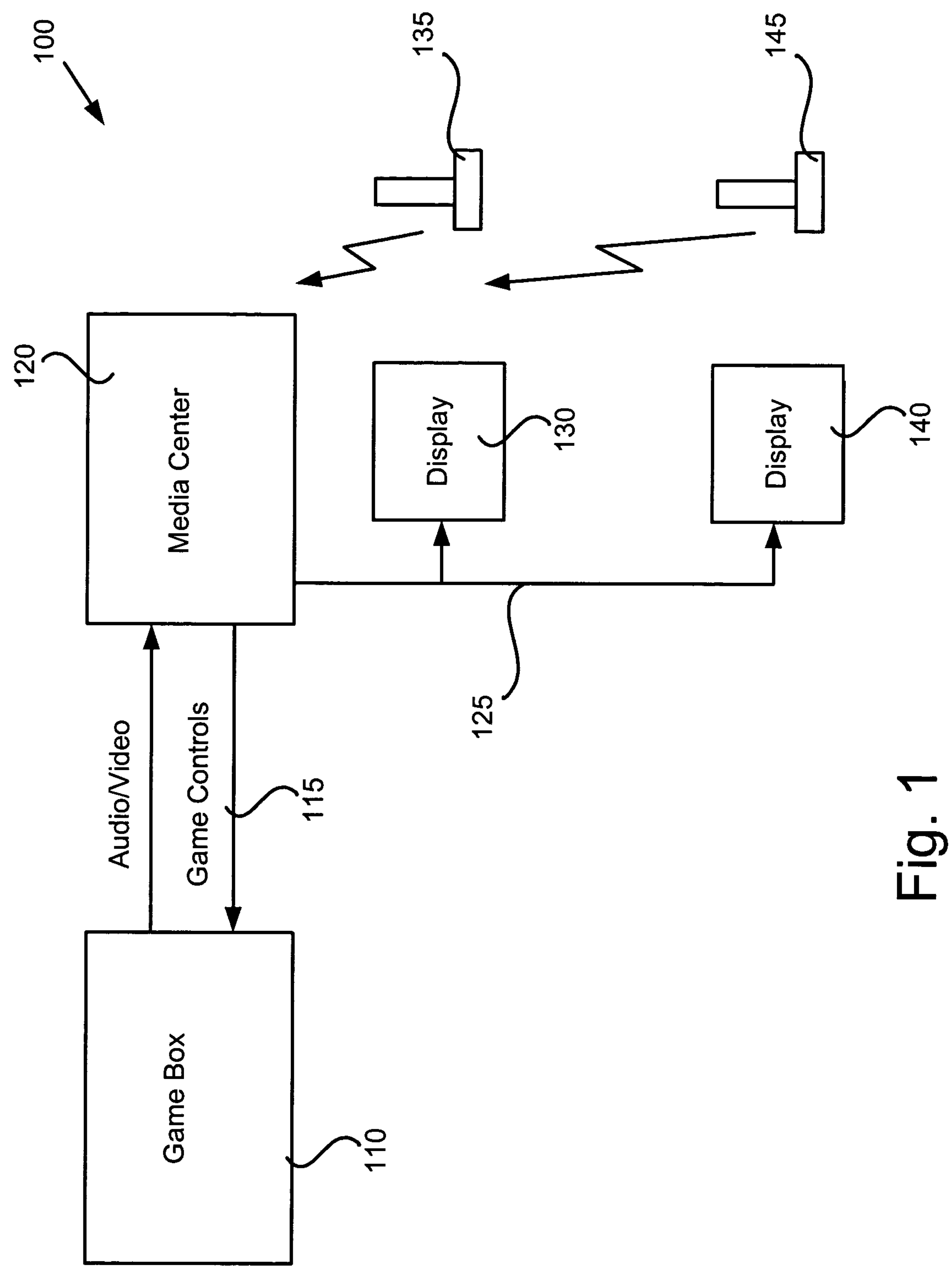
FIG. 1 illustrates an exemplary media center system consistent with the principles of the invention.

FIG. 1 illustrates an exemplary media center system 100 consistent with the principles of the invention. System 100 may include a game box 110, a game communication link 115, a media center 120, a media communication link 125, a first display 130, a first controller 135, a second display 140, and a second controller 145. Media center 120 may communicate with game box 110 via game communication link 115, and media center 120 may communicate with first display 130 and second display 140 via media communication link 125.

Game box 110 may be arranged to execute a video game or other program and to output information (e.g., video and/or audio information) to media center 140 via game communication link 115. Game box 110 may also be arranged to receive input information from media center 140 via game communication link 115. Such input information may be used by the video game or other program, and may modify the output information sent to media center 140. In one implementation consistent with the principles of the invention, the program executed by game box 110 may include a video game that produces a steam of video information (possibly including audio information) to be sent to media center 140. Other programs are possible, such as one that streams a movie (e.g., video and sound data) to media center 140, a telephony application, etc.

Game communication link 115 may include a wireless or wired (e.g., electrically or optically conductive transport media) link between game box 110 and media center 120. Game communication link 115 may be used primarily for transporting media information (e.g., video and/or audio data) from game box 110 to media center 140, and game communication link 115 also may be used for transmitting control/input information from media center 140 to game box 110. In implementations where game box 110 and media center 140 are located proximately, game communication link 115 may be a wired link, such as an Ethernet link, an IEEE 1394a or 1394b link, a synchronous optical network (SONET) link, or other wired link using a custom protocol. In implementations where game box 110 is located remote from media center 140, game communication link 115 may be a wireless link, such as an IEEE 802.1 la link, an IEEE 802.1 lb link, an IEEE 802.11g link, or similar wireless links.

Media center 120 may receive input information from game box 110 via game communication link 115 or from a media provider (not shown) via media communication link 125. Although not shown in FIG. 1, media communication link 125 may be connected to a media provider, such as a cable or satellite television source. Media center 120 also may output information to displays 130/140 via media communication link 125.

Figure 2:
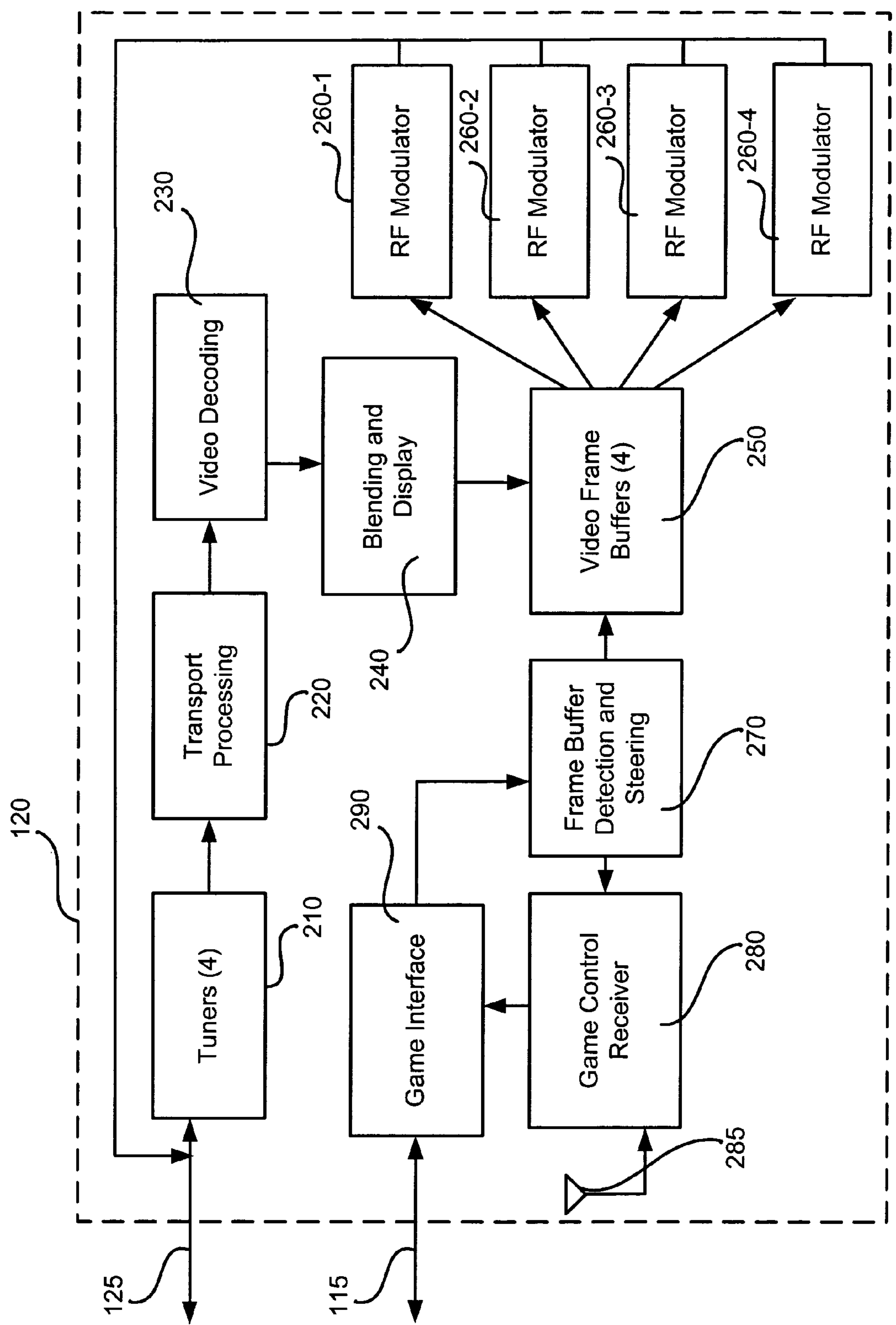
FIG. 2 illustrates an exemplary device in the media center system of FIG. 1 according to an implementation consistent with the principles of the invention.

FIG. 2 illustrates an exemplary implementation of media center 120 in media center system 100 consistent with the principles of the invention. Media center 120 may include tuners 210, a transport processing module 220, a video decoding module 230, a blending and display module 240, video frame buffers 250, first through fourth modulators 260-1 to 260-4 (collectively "modulators 260"), a detection and steering module 270, a game control receiver 280, an antenna 285, and a game interface 290. Although media center 120 may include some or all of elements 210-290, it may also include other elements that are not illustrated for clarity of explanation. Further, elements 210-290 may be implemented by hardware, software/firmware, or some combination thereof, and although illustrated as functional modules for ease of explanation, elements 210-290 may not be discrete elements within media center 120.

Tuners 210 may include one or more devices arranged to separate stream(s) of information from media communication link 125. For example, each tuner 210 may lock onto and output one television channel or other information present at a certain frequency range. In the particular implementation illustrated in FIG. 2, four tuners 210 are illustrated, but media center 120 may include a smaller or greater number of tuners in other implementations.

Transport processing module 220 may be arranged to provide conditional access to the information from tuner 210 according to predetermined parameters. For example, transport processing module 220 may allow and/or disallow the viewing of certain channels of data (e.g., premium content) based on a certain level of service. In some implementations, transport processing module 220 may multiplex video packets from tuners 210 to enforce other access rules, such as only children's programming to a certain television.

Video decoding module 230 may decode streams from transport processing module 220. In some implementations consistent with the principles of the invention, video decoding module 230 may be arranged to decode parallel streams of data (e.g., from the four tuners 210).

Blending and display module 240 may be arranged to blend the decoded video data from video decoding module 230 with any other display information, such as menus, graphical overlays, time/date, or other similar information. Blending and display module 240 may also combine streams of information (e.g., from different tuners 210) to accomplish functions, such as picture-in-picture.

Video frame buffers 250 may buffer frames of video information before it is sent to modulators 260. In the implementation shown in FIG. 2, the number of video frame buffers, four, may correspond to the number of modulators 260. Video frame buffers 250 may store portions of four different streams of video to be modulated by modulators 260. Video frame buffers 250 may receive input from blending and display module 240 or from detection and steering module 270. In one mode, video frame buffers 250 may receive, for example, television channel data from media communication link 125 via blending and display module 240. In another mode, video frame buffers 250 may receive, for example, video game data from game communication link 115 via detection and steering module 270. These non-exclusive modes of display may be selected by a controller (not shown) in media center 120.

Modulators 260 may receive four distinct streams of video data, and may modulate them (perhaps at different radio frequencies (RF)) to place them on separate channels of media communication link 125. In one implementation, modulators 260 may place some channels of information from tuners 210 (e.g., channels 100, 200, 250, and 300) on other (possibly unused) channels on media communication link 125, such as channels 501, 502, 503, and 504. Televisions connected to media communication link 125 may then be adjusted to these output channels of modulators 260, and content on the channels may be varied via changing tuners 210. Such re-introduction of media information to media communication link 125 by modulators 260 may be referred to as "back-modulating."

Detection and steering module 270 may be arranged to receive video/audio information from game communication link 115 (via game interface 290) and to direct the information to video frame buffers 250. Detection and steering module 270 may be arranged to operate in one of at least two modes: a normal mode and an enhanced mode. In the normal mode, detection and steering module 270 may steer all received video information to one or more of video frame buffers 250 (and hence modulators 260 and their associated channels). For example, detection and steering module 270 may steer received video information to all of video buffers 250, allowing a single video game to be displayed on any one (or ones) of multiple displays tuned to the outputs of modulators 260. In the exemplary configuration shown in FIGS. 1 and 2, video game information from game box 110 may be displayed on up to four displays (e.g., displays 130/140) in different locations (e.g., rooms in a residence).

Also in the normal mode, detection and steering module 270 may steer all received video information to a specified one of video frame buffers 250. In such a scheme, video game information from game box 110 may be presented on a particular display (e.g., display 130) that is tuned to modulator 260-1, but other, non-game media information (e.g., television channels) may be presented on displays (e.g., display 140) tuned to the other modulators 260-2 through 260-4. Other variations will be apparent in the normal mode in light of the above examples.

In the enhanced mode, detection and steering module 270 may steer some received video information to some video frame buffers 250 and other received video information to other video frame buffers 250. For example, the video/audio information from game box 110 may include two or more distinct, time-multiplexed streams that are each tagged with a different identifier. Detection and steering module 270 may detect the identifier tags within frames of video/audio information, and may direct differently-tagged information to different video frame buffers 250 (and hence modulators 260 and their associated channels).

One example of such a scheme may be where the video frame rate is doubled (e.g., 60 frames per second (fps) verses a nominal 30 fps rate) and differently tagged (e.g., every other frame) by game box 110 for display on two different devices (e.g., displays 130 and 140). Detection and steering module 270 may send half of the received frames of information to the buffer 250 corresponding to modulator 260-1 based on a first identifying tag in the frames. Detection and steering module 270 may send the other half of the received frames of information to the buffer 250 corresponding to modulator 260-2 based on a second identifying tag in the frames. There are several techniques that may be used to tag the video frames/fields coming from game box 110. The tagging information may be inserted in the vertical blanking interval between frames, buried in the display information, used on even/odd fields, etc.

A similar scheme may be used to separate audio for display on two different devices (e.g., displays 130 and 140). For example, different audio may be played at each of displays 130 and 140 by routing a left audio channel to one display 130 and a right audio channel to the other display 140. Other schemes for steering audio information are contemplated, and may be practiced by those skilled in the art without undue experimentation.

Such an enhanced mode of media center 120 may permit game box 1.10 to send, and displays 130 and 140 to display, at least two distinct sets of video/audio information. This distinct information may facilitate new types of video game/entertainment experiences (e.g., hide and seek, capture the flag, or other perspective-driven scenarios) where each of displays 130 and 140 may display a unique perspective for each user, as opposed to a single, common perspective for all displays 130/140 in the normal mode of media center 120.

In conjunction with detecting tags within incoming video/audio information, detection and steering module 270 may also output tag-related information to game control receiver 280. Such tag-related information (e.g., which stream is currently being output to buffers 250) may be used by game control receiver to handle information from multiple controllers 135/145.

Game control receiver 280 may receive control information from one or more, controllers 135/145 via antenna 285. In some implementations, game control receiver 280 may receive input via a wired interface (e.g., game communication link 115 and/or media communication link 125) instead of, or in addition to, antenna 285. Game control receiver 280 may be arranged to differentiate between inputs from different controllers 135/145 based on identifying information, such as transmission frequency and/or a unique controller identifier in the received control information.

Game control receiver 280 also may be arranged to multiplex control information from different controllers 135/145 before sending it to game interface 290 based on an input from detection and steering module 270. For example, game control receiver 280 may time-multiplex input from different controllers according to tag information detected by detection and steering module 270. When video information arrives for a certain display device (e.g., display 130), for example, game control receiver 280 may receive the tag in the video information and may transmit control information from the controller (e.g., controller 135) that corresponds to that certain display device. Conversely, when video information destined for another display device (e.g., display 140) is received, game control receiver 280 may transmit control information from the controller (e.g., controller 145) that corresponds to that display device based on another tag in the video information.

Game interface 290 may be arranged to communicate with game box 110 via game communication link 115. Game interface 290 may include necessary circuitry to format and/or encode/decode information and physically interface with game communication link 115, regardless of whether game communication link 115 is a wired or wireless link. Game interface 290 may direct received video/audio information to detection and steering module 270, and may also direct control information from game control receiver 280 to game communication link 115.

Returning to FIG. 1, media communication link 125 may include a wireless or wired (e.g., electrically or optically conductive transport media) link between media center 140 and displays 130/140. In one implementation consistent with the principles of the invention, media communication link 125 may include a coaxial cable or other wired link suitable for transporting video/audio information to displays 130/140. Although not explicitly illustrated in FIG. 1, media communication link 125 may also be connected to a media provider, such as a cable television provider or satellite television provider.

Displays 130/140 may include a television, monitor, projector, or other device suitable for displaying media information, such as video and audio. Displays 130/140 may utilize a number of technologies for such displaying, including cathode ray tube (CRT), liquid crystal display (LCD), plasma, and/or projection-type technologies. In some implementations, at least one of displays 130/140 may be located proximate media center 120, which may in some implementations sit on top of or adjacent to the display. In other implementations consistent with the principles of the invention, displays 130/140 may be located remote from media center 120, and perhaps also remote from each other. For example, displays 130/140 may be located in different rooms in a building.

It should be noted that two displays 130/140 are illustrated in FIG. 1 for ease of explanation only. As described above with regard to FIG. 2, media center 120 may interface with four or more different display devices, only two of which are illustrated in FIG. 1.

Controllers 135/145 may be connected to media center 120 to supply input to a program on game box 110. Controllers 135/145 may communicate with media center 120 via wireless or wired communication links (e.g., media communication link 125). Although primarily input/control devices, controllers 135/145 may perform both input and output functions, because some controllers may include force feedback schemes or other mechanisms to output information to a user of the device.

Controllers 135/145 may be associated with particular displays 130/140 through an initialization process, a proximity sensor, or other scheme. Although a single controller 135 is shown near display 130 in FIG. 1, multiple controllers may be associated with a single display to facilitate multiple-user games where users desire to be together in the same room.

Figure 3:
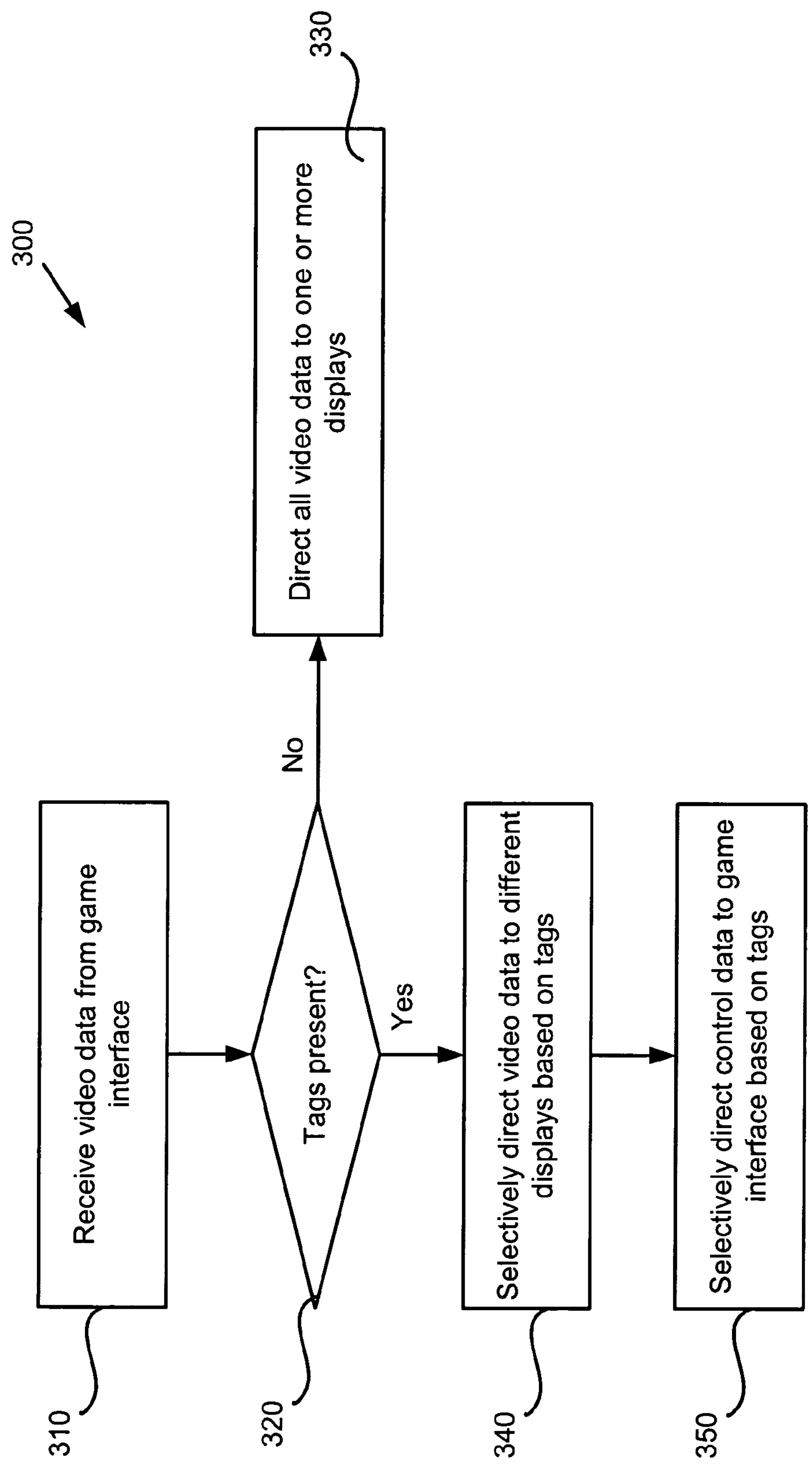
FIG. 3 is a flow chart illustrating a process of handling data by a media center according to an implementation consistent with the principles of the invention.

FIG. 3 is a flow chart illustrating a process 300 of handling data by media center 120 according to an implementation consistent with the principles of the invention. Processing may begin by receiving video/audio data from game box 110 via game interface 290 [act 310]. This video/audio data may be output by a video game or other program running on game box 110, and it may or may not include different tags within frames. In some implementations, game box 110 may switch between a normal mode (without distinct tags) and an enhanced mode (with distinct tags), perhaps based on input from media center 120 and/or controllers 135/145.

Detection and steering module 270 may determine whether tags (e.g., distinct tags for different video streams) are present in the received video data [act 320]. By the presence or absence of tags (or different tags in different frames of video), detection and steering module 270 may determine whether to operate in the normal mode or the enhanced mode.

If tags are not present in the video data, or if detection and steering module 270 otherwise selects the normal mode of operation, it may direct all received video data to one or more video buffers 250 [act 330]. From video buffers 250, the video data may be modulated by one or more different modulators 260-1 to 260-4 for reception by one or more displays 130/140 tuned in to modulators 260. The video data may be directed to a single modulator (e.g., modulator 260-3) that corresponds to a display (e.g., display 140) in a certain location/room, or the same video data may be directed to a multiple modulators 260 that correspond to multiple displays (e.g., display 130/140) in different locations/rooms.

If tags are present in the video data, or if detection and steering module 270 otherwise selects the enhanced mode of operation, it may selectively direct the received video data to different ones of video buffers 250 [act 340]. From video buffers 250, the video data may be modulated by at least two different modulators (e.g., modulators 260-1 and 260-2) for reception by at least two different displays 130 and 140 tuned in to the different modulators. Based on tags in the video data, for example, half of the frames (e.g., one distinct video stream) may be directed to one of modulators 260 and the other half of the frames (e.g., another distinct video stream) may be directed to another one of modulators 260. In this manner, two displays 130 and 140 may display different video streams from game box 110. Similarly, three or more different tags in the video may be detected by detection and steering module 270 to display distinct video/audio streams on different displays.

Processing may continue with game control receiver 280 selectively directing control data from controllers 135/145 to game interface 290 based on tag information from detection and steering module 270 [act 350]. If detection and steering module 270 detects tags in the video data, it may send the tags or tag-related information to game control receiver 280. Game control receiver 280 may time-multiplex control data from two or more different controllers 135/145 based on the received tag information. This multiplexed control information may be sent to game box 110 by game interface 290.

The foregoing description of one or more implementations consistent with the principles of the invention provides illustration and description, but is not intended to be exhaustive or to limit the claimed invention to the precise form disclosed.

Modifications and variations are possible in light of the above teachings or may be acquired from practice of the invention.

For example, although game box 110 has been described as a specific-purpose device, other general-purpose computing devices may be used in its stead consistent with the principles of the invention described herein. Further, different types of game boxes 110 may be interchangeably used in the configuration illustrated in FIG. 1. Moreover, multiple game boxes 110 may be used in conjunction with one media center 120.

Moreover, the acts in FIG. 3 need not be implemented in the order shown; nor do all of the acts necessarily need to be performed. Also, those acts that are not dependent on other acts may be performed in parallel with the other acts. Further, the acts in this figure may be implemented as instructions, or groups of instructions, implemented in a computer-readable medium.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the claimed invention is defined by the claims and their equivalents.

What is claimed:

1. A method comprising:

providing at least one media center to provide electronic game data for one game to at least two game players of said game who play the game at the same time in concert;

separating the game data so that separate game images may be provided for each of the game players who play the same game and such that the game images for each of the players may be different in at least some respects; and receiving, wireless game control commands from said players using separate wireless controllers and identifying which commands originate with each of said game players by decoding tags appended to said wireless game control commands so that a command from one player is distinguished by said media player from a game control command received from the other player using said tags appended to said wireless game control commands.

2. The method of claim 1 including associating game data with tags, each tag indicative of a different player.

3. The method of claim 2 including providing controls which each game player may utilize to provide input commands to the media center.

4. The method of claim 1 including enabling a controller for each player to wirelessly use a different frequency to wirelessly communicate with said media center and enabling said media center to provide game data to each controller using a different and distinct frequency for each game controller.

5. An apparatus comprising:

a media center to provide electronic game data for one game to at least two players of said game who play the game at the same time in concert;

a detection and steering module to separate the game data so that separate game images may be provided for each of the game players who play the same game and such that the game images for each of said players may be different in at least some respects, said detection and steering module to receive game commands from said players using separate wireless controllers and to identify which commands originate with each of said game players by detecting tags appended to game commands that identify the originating controller and distinguish commands from one controller from those of the other controller; and a plurality of buffers to store video game data routed from the detection and steering module.

6. The apparatus of claim 5, said detection and steering module to associate game data with tags, each tag indicative of a different player.

7. The apparatus of claim 6, said apparatus further including controls which each player may utilize to provide input commands to the module.

8. The apparatus of claim 7, said controls to append tags that allow game control commands from one player to be distinguished by said interface from game control commands received from the other player.

9. The apparatus of claim 5 including a controller for each player to wirelessly use a different frequency to wirelessly communicate with said module and to enable said module to provide game data to each controller using a different and distinct frequency for each game controller.

10. The apparatus of claim 1 wherein said detection and steering module to route time multiplexed video game data with a particular tag to a particular buffer based on the detected tag.

* * * * *